US011475631B2

(12) United States Patent
Lee et al.

(10) Patent No.: US 11,475,631 B2
(45) Date of Patent: Oct. 18, 2022

(54) TRAINING DATASET GENERATION FOR DEPTH MEASUREMENT

(71) Applicant: SONY CORPORATION, Tokyo (JP)

(72) Inventors: Jong Hwa Lee, San Diego, CA (US); Gareth White, San Diego, CA (US); Antti Myllykoski, San Diego, CA (US); Edward Theodore Winter, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/101,009

(22) Filed: Nov. 23, 2020

(65) Prior Publication Data
US 2022/0165027 A1 May 26, 2022

(51) Int. Cl.
G06T 17/20 (2006.01)
G06T 7/70 (2017.01)

(52) U.S. Cl.
CPC ............... *G06T 17/20* (2013.01); *G06T 7/70* (2017.01); *G06T 2207/10028* (2013.01); *G06T 2207/20081* (2013.01); *G06T 2207/20084* (2013.01)

(58) Field of Classification Search
CPC . G06T 17/20; G06T 7/70; G06T 2207/10028; G06T 2207/20081; G06T 2207/20084
USPC ......................................................... 345/419
See application file for complete search history.

(56) References Cited

U.S. PATENT DOCUMENTS

| 2015/0248764 | A1 | 9/2015 | Keskin et al. | |
| 2015/0248765 | A1* | 9/2015 | Criminisi | G06T 7/50 382/106 |
| 2017/0262768 | A1* | 9/2017 | Nowozin | G06K 9/20 |
| 2018/0075315 | A1* | 3/2018 | Gu | G06T 5/50 |
| 2019/0197667 | A1 | 6/2019 | Paluri | |

FOREIGN PATENT DOCUMENTS

WO 2020/039166 A1 2/2020

OTHER PUBLICATIONS

Zhu, et al., "Unpaired Image-to-Image Translation using Cycle-Consistent Adversarial Networks", IEEE International Conference on Computer Vision (ICCV), Dec. 25, 2017, 18 pages.

(Continued)

*Primary Examiner* — Hai Tao Sun
(74) *Attorney, Agent, or Firm* — Chip Law Group

(57) ABSTRACT

A system for generation of training dataset is provided. The system controls a depth sensor to capture, from a first viewpoint, a first image a first depth value associated with the first object. The system receives tracking information from a handheld device associated with the depth sensor, based on a movement of the handheld device and the depth sensor in a 3D space. The system generates graphic information corresponding to the first object based on the received tracking information. The graphic information includes the first object from a second viewpoint. The system calculates a second depth value associated with the first object, based on the graphic information. The system generates, for a neural network model, a training dataset which includes a first combination of the first image and the first depth value, and a second combination of second images corresponding to the graphic information and the second depth value.

18 Claims, 6 Drawing Sheets

(56) References Cited

OTHER PUBLICATIONS

Wang, et al., "High-Resolution Image Synthesis and Semantic Manipulation with Conditional GANs", IEEE/CVF Conference on Computer Vision and Pattern Recognition, Dec. 17, 2018, 14 pages.
Isola, et al., "Image-to-Image Translation with Conditional Adversarial Networks", IEEE Conference on Computer Vision and Pattern Recognition (CVPR), Nov. 9, 2017, 17 pages.
International Search Report and Written Opinion of PCT Application No. PCT/IB2021/060890, dated Mar. 4, 2022, 01 page of ISRWO.
Abdulwahab, et al., "Adversarial Learning for Depth and Viewpoint Estimation From a Single Image", IEEE Transactions On Circuits And Systems For Video Technology, vol. 30, No. 9, Sep. 2020, pp. 2947-2958.

* cited by examiner

TRAINING DATASET GENERATION FOR DEPTH MEASUREMENT

REFERENCE

None.

FIELD

Various embodiments of the disclosure relate to dataset generation for a neural network model. More specifically, various embodiments of the disclosure relate to a system and method for generation of a training dataset for a neural network model for depth measurement.

BACKGROUND

Conventionally, range imaging applications are used for depth estimation. The range imaging applications may utilize various types of depth sensors (such as a time-of-flight (ToF) sensor) for the depth estimation of objects present in a real environment. Generally, the depth sensors employed by the range imaging applications may be expensive and structurally difficult to implement. Therefore, for the collection of a large set of depth values for different objects present in the real environment, deployment of large set of depth sensors (or capture depth values of the objects from large number of positions or viewpoints) may be a complex and expensive task.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for generation of a training dataset for depth measurement, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
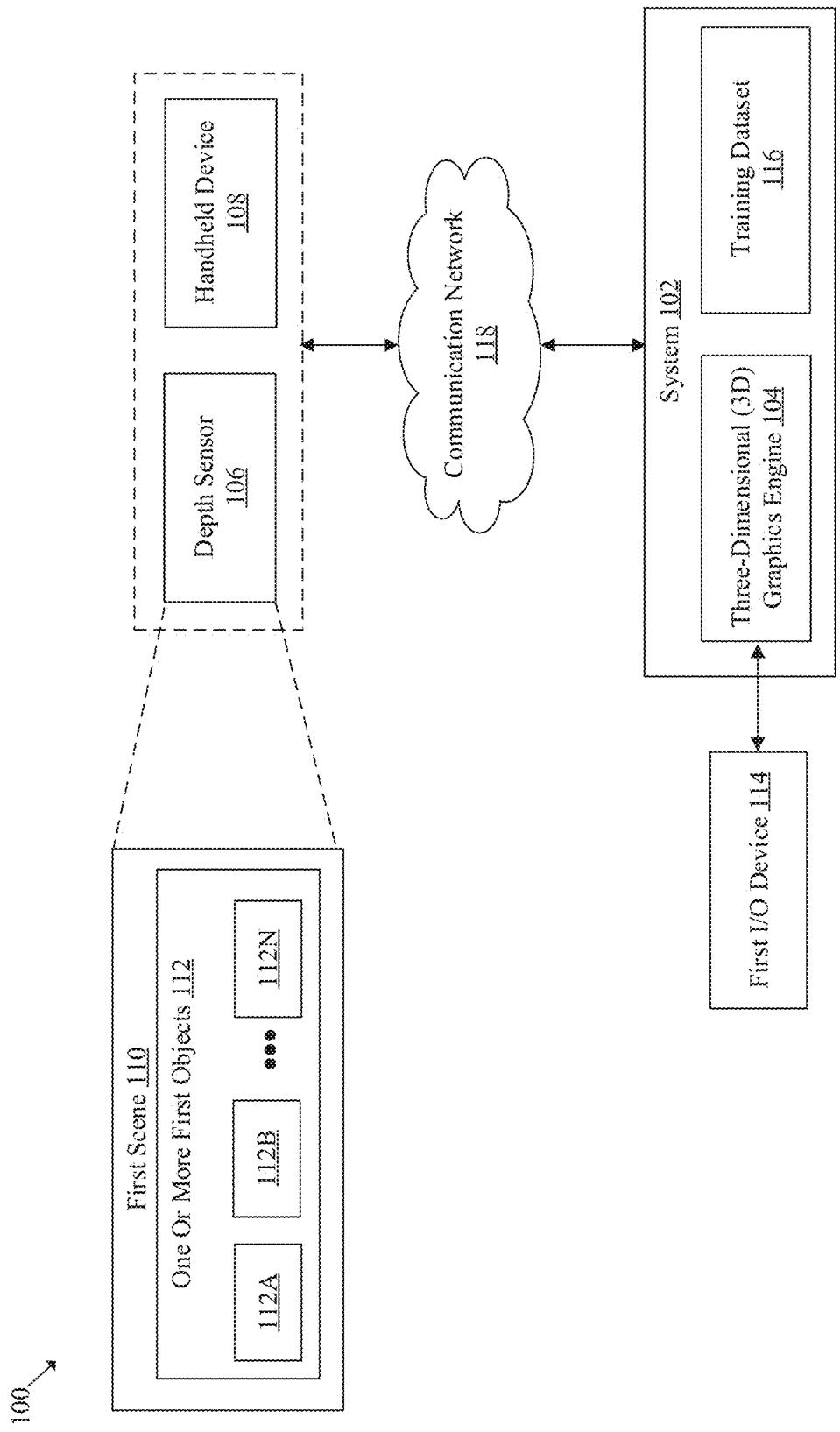
FIG. 1 is a diagram of an exemplary network environment for generation of a training dataset for depth measurement, in accordance with an embodiment of the disclosure.

The following described implementations may be found in the disclosed system and method for generation of a training dataset for depth measurement. Exemplary aspects of the disclosure provide a system configured to control a depth sensor (such as a time-of-flight (ToF) sensor) to capture, from a first viewpoint, a first image of one or more first objects. Examples of the one or more first objects may include, but are not limited to, animated objects (such as human beings) or inanimate objects (such as non-living entities like furniture, electronic gadgets, or infrastructure). The first image may be associated with a first object (such as a chair) of the one or more first objects. The first image may include color information (such as red, green, blue (RGB) information) of the one or more first objects. The first viewpoint may be, for example, a front view of the first object (such as the chair) with respect to the depth sensor. The system may further control the depth sensor to capture a first depth value associated with the one or more first objects, from the first viewpoint (such as the front view). The first depth value may indicate a depth information or a distance between the depth sensor and one or more points on a surface (i.e. visible from the first viewpoint) of the one or more first objects.

The system may further receive tracking information from a handheld device (for example, a virtual reality device) based on a movement of the handheld device and the depth sensor in a three-dimensional (3D) space. The handheld device may be connected (or joined or integrated) with the depth sensor. For example, a position and an orientation of the depth sensor may change in the 3D space based on the movement of the handheld device and the depth sensor, after the capture of the first image. Therefore, the tracking information may indicate position information or orientation information of the depth sensor in the 3D space. The system may further generate graphic information (for example, not limited to, point cloud data, images, video, or 3D mesh) corresponding to the one or more first objects based on the received tracking information (i.e. movement of the depth sensor). In accordance with an embodiment, the system may include a 3D graphics engine (for example an animation engine or an animation application) to generate the graphic information. The graphic information may include or correspond to the one or more first objects (such as the chair) from one or more second viewpoints (such as, but not limited to, a side view, a top view, or a back view) different from the first viewpoint. The second viewpoint of the one or more first objects may be based on the movement of the handheld device and the depth sensor in the 3D space. The generation of the graphic information by the disclosed system may thus, enable transformation of real world information (such as the one or more first objects captured in the first image by the depth sensor) into virtual information (such as the graphic information associated with the one or more first objects and generated from the second viewpoints different from the first viewpoint at which the first image is captured).

The system may further calculate one or more second depth values associated with the one or more first objects, based on the graphic information generated from the one or more second viewpoints. The one or more second depth values may include depth information (such as distance information) between the depth sensor and the one or more first objects from the one or more second viewpoints. The system may further enable generation and depiction of the graphic information in a virtual environment (such as in the 3D graphics engine) for the calculation of the one or more second depth values associated with the one or more first objects based on the generated graphic information. Thus, the disclosed system may allow the calculation of the one or more second depth values from the graphic information that may be time efficient as compared to depth values calculated by conventional depth sensors.

In some embodiments, the system may generate one or more second images corresponding to the graphic information. The one or more second images about the one or more first objects from the one or more second viewpoints may be referred as synthetic data generated by the system (or by the 3D graphics engine of the system). The generation of the synthetic data associated with the one or more first objects (i.e. real objects) may be inexpensive as compared to capture of real data (such as first image) by the depth sensor for large set of objects available in a real environment. Therefore, the system may enable generation of the synthetic data (i.e. graphic information or images of the objects generated from different viewpoints) from the limited real-world data (i.e. first image of the real object captured from the depth sensor from the first viewpoint). For example, the system (i.e. 3D graphics engine) may enable generation of the synthetic data (i.e. graphic information) associated with a wrecked ship (i.e. object) present in an ocean by the 3D recreation of the wrecked ship in the 3D graphics engine, without repeated scan of the wrecked ship (i.e. by use of the depth sensor) from different viewpoints.

Furthermore, the system may generate, for a neural network model, a training dataset which may include a first combination of the first image (i.e. real image of the object captured from the first viewpoint) and the first depth value (i.e. real depth value), and further include a second combination of the one or more second images corresponding to the graphic information of the object (i.e. generated from the 3D graphics engine from different viewpoints) and the one or more second depth values (i.e. calculated from the graphic information about the object). In another embodiment, the disclosed system may generate a third image based on the first depth value and one or more fourth images based on the one or more second depth values to further generate the training dataset which may include the first combination (i.e. real data) of the first image and the third image and further include the second combination (i.e. virtual data) of the second images and the fourth images. Therefore, the training dataset generated by the system may include the inexpensively generated synthetic data that may be used to train the neural network model. The neural network model trained on the generated training dataset may be utilized for automatic prediction of the depth values from the images (such as images with two-dimensional (2D) information) provided as input to the neural network model.

FIG. 1 is a diagram of an exemplary network environment for generation of a training dataset for depth measurement, in accordance with an embodiment of the disclosure. With reference to FIG. 1, there is shown a block diagram of a network environment 100. The network environment 100 may include a system 102. The system 102 may include a three-dimensional (3D) graphics engine 104. The network environment 100 may further include a depth sensor 106 and a handheld device 108. The network environment 100 may further include a first scene 110. The first scene 110 may include one or more first objects 112. The one or more first objects 112 may include a first object 112A, a second object 112B and an Nth object 112N. The network environment 100 may further include a first input/output (I/O) device 114. The system 102 may further include a training dataset 116 generated by the system 102 for the one or more first objects 112 present in the first scene 110 or in different scenes. Furthermore, the network environment 100 may include a communication network 118, through which the system 102, the depth sensor 106, and the handheld device 108 may communicate.

The system 102 may include suitable logic, circuitry, and interfaces that may be configured to receive a first image of the one or more first objects 112 and a first depth value associated with the one or more first objects 112 from the depth sensor 106. The system 102 may further generate graphic information and calculate one or more second depth values associated with the one or more first objects 112. The system 102 may be further configured to generate, for a neural network model, the training dataset 116 that may include a first combination of the first image and the first depth value, and a second combination of one or more second images corresponding to the graphic information and the one or more second depth values. Examples of the system 102 may include, but are not limited to, an animation system, a computing device, a laptop, a mainframe machine, a server, a computer work-station, a smartphone, a cellular phone, a mobile phone, a gaming device and/or a consumer electronic (CE) device.

The 3D graphics engine 104 may include suitable logic, circuitry, interfaces and/or code that may be configured to generate the graphic information corresponding to the one or more first objects 112 from the one or more second viewpoints, based on the tracking information received by the system 102. The 3D graphics engine 104 may further control a display device (such as included in the first I/O device 114) to render the generated graphic information associated with the one or more first objects 112. The 3D graphics engine 104 may utilize a script generator (such as a python script generator) to generate the graphic information. In some embodiments, the 3D graphics engine 104 may control the display device to render the first image of the one or more first objects 112 captured by the depth sensor 106 from the first viewpoint, and receive one or more user inputs for the rendered first image, via the first I/O device 114, to generate the graphic information for the one or more first objects 112 from different viewpoints. The graphic information of the one or more first objects 112 may include, but is not limited to, a rotated object, resized object, re-positioned object, point cloud data, video information, voxel information, or 3D mesh). Examples of the 3D graphics engine 104 may include, but are not limited to, a 3D computer graphics engine, a 3D creation application, a 3D modelling or simulation application, a 3D animation engine, or a video editing application.

The depth sensor 106 may include suitable logic, circuitry, and interfaces that may be configured to capture the first image of the one or more first objects 112. The depth sensor 106 may be further configured to capture the first depth value associated with the one or more first objects 112, such as the first object 112A. The first depth value may indicate a distance between the depth sensor 106 and one or more points on a surface of the first object 112A. Examples of the depth sensor 106 may include, but are not limited to, a time of flight (ToF) sensor, a light detection and ranging (LiDAR) sensor, a stereo image sensor, or a structured light sensor.

The handheld device 108 may include suitable logic, circuitry, and interfaces that may be configured to generate the tracking information associated with the depth sensor 106, based on a movement of the handheld device 108 and the depth sensor 106 in a 3D space. The handheld device 108 may be held or worn by a user (shown in FIG. 3) and may be integrated with the depth sensor 106. The handheld device 108 may include one or more sensors to generate the tracking information (i.e. position or orientation in the 3D space). Examples of the handheld device 108 may include, but are not limited to, a virtual reality device, an augmented reality device, or a mixed reality device. In some embodiments, the handheld device 108 may be any computing device integrated with the sensors to detect the position or orientation of the handheld device 108 in the 3D space. The sensors may include, but are not limited to, an inertial measurement unit (IMU) sensor, an accelerometer, a gyroscope, or a motion sensing device.

The first scene 110 may include or may be related to a real environment, such as a room of a building, an open space area such as a park, underwater scene, such as a scene of an ocean and so forth. The first scene 110 may include the one or more first objects 112, such as the first object 112A, the second object 112B and the Nth object 112N. Examples of the one or more first objects 112 may include, but are not limited to, animate object (such as human beings, animals), or inanimate objects (such as furniture, electronic gadgets, infrastructure, transportation objects, or decorative objects).

Figure 2:
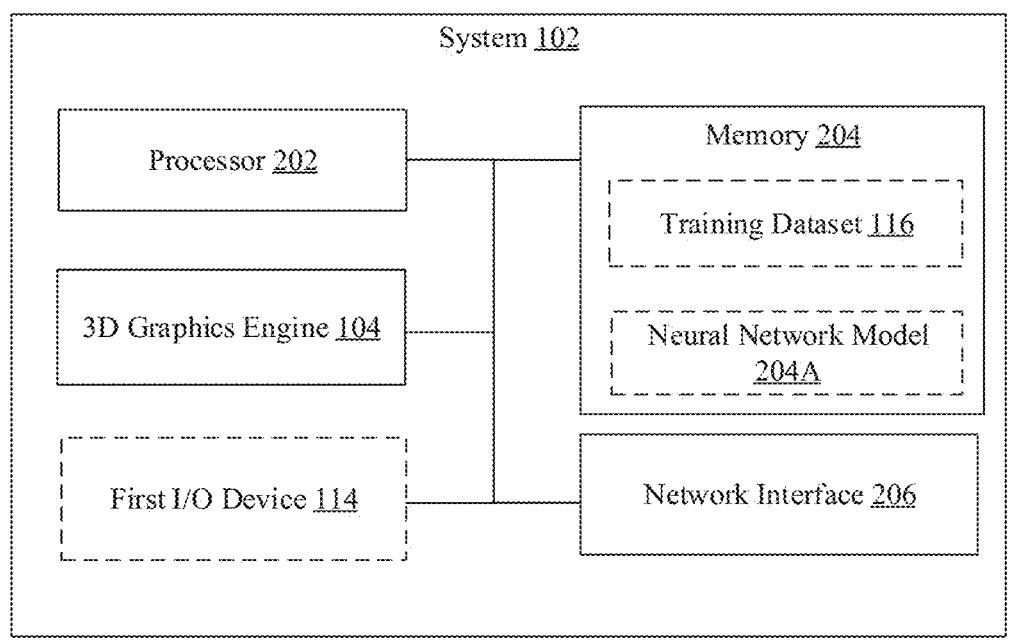
FIG. 2 is a block diagram of a system for generation of a training dataset for depth measurement, in accordance with an embodiment of the disclosure.

The first input/output (I/O) device 114 may include suitable logic, circuitry, and interfaces that may be configured to receive an input from a user and provide an output based on the received input. The first I/O device 114 may be configured to receive the input from the user (shown in FIG. 3) for the generation of the graphic information corresponding to the one or more first objects 112. The first I/O device 114 may further display the first image captured by the depth sensor 106 or display the calculated one or more second depth values or the fourth images associated with the one or more first objects 112. The first I/O device 114, which may include various input and output devices, may be configured to communicate with the system 102 or the 3D graphics engine 104. Examples of the first I/O device 114 may include, but are not limited to, a touch screen, a keyboard, a mouse, a joystick, a microphone, or a display device. Although in FIG. 1, the first I/O device 114 is shown separated from the system 102, the disclosure is not so limited. Accordingly, in some embodiments, the first I/O device 114 may be integrated in the 3D graphics engine 104 of the system 102 as shown in FIG. 2, without deviation from scope of the disclosure.

The training dataset 116 may be an image based dataset that may be utilized by a neural network model for prediction of depth values from a 2D image. The training dataset 116 may include a first set of paired dataset (such as a first set of paired images). The first set of paired images may include the first image that may include color information of the first object 112A and a corresponding third image that may include or correspond to the depth information (i.e. first depth value) of the first object 112A. The training dataset 116 may further include a first set of unpaired dataset (such a first set of unpaired images). The first set of unpaired images may include the graphic information (i.e. the second image) of the first object 112A generated from a different viewpoint by the 3D graphics engine 104 and a corresponding fourth image that may include or correspond to the depth information (i.e. second depth values) of the first object 112A from the different viewpoint. Thus, the neural network model may be trained on the generated training dataset 116 that may include the first set of paired images and the first set of unpaired images.

The communication network 118 may include a communication medium through which the system 102, the depth sensor 106 and the handheld device 108 may communicate with each other. The communication network 118 may be one of a wired connection or a wireless connection Examples of the communication network 118 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 118 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to control the depth sensor 106 to capture, from a first viewpoint, a first image of the one or more first objects 112 present in the first scene 110 and capture the first depth value associated with the one or more first objects 112. The first scene 110 may depict the one or more first objects 112 and surroundings, such as walls around the one or more first objects 112. The first image may include the color information of the one or more first objects 112. The first viewpoint may be for example, a front view of the first object 112A of the one or more first objects 112. In accordance with an embodiment, the first depth value associated with the one or more first objects 112 may indicate the depth information (i.e. distance) between the depth sensor 106 and a first plurality of points on a surface of the one or more first objects 112 captured from the first viewpoint. Details of the control of the depth sensor 106 to capture the first image and the first depth value associated with the one or more first objects 112 are further provided, for example, in FIG. 4A.

The system 102 may further receive the tracking information from the handheld device 108 associated with the depth sensor 106, based on a movement of the handheld device 108 and the depth sensor 106 in the 3D space. The tracking information may indicate the position information (X-axis, Y-axis, Z-axis information) or the orientation information of the depth sensor 106 in the 3D space. The position information or the orientation information of the depth sensor 106 may change based on the change in the position and the orientation of the depth sensor 106 in the 3D space. Details of the receipt of the tracking information are further provided, for example, in FIG. 4A.

The system 102 may further generate the graphic information corresponding to the one or more first objects 112 based on the received tracking information. In some embodiments, the system 102 may generate the graphic information corresponding to the one or more first objects 112 based on one or more user inputs received from the first I/O device 114. The graphic information may include, but is not limited to, one or more second images, point cloud data, a set of voxels, a three-dimensional (3D) mesh, video information, LAS (LASer) format data or proprietary format data. In accordance with an embodiment, the 3D graphics engine 104 included in the system 102 may be configured to generate the graphic information corresponding to the one or more first objects 112. The graphic information may include or correspond to the one or more first objects 112 from the one or more second viewpoints different from the first viewpoint. The one or more second viewpoints may include, for example, the front view, the side view, the back view, the top view, the rotated view, or the translated view of the one or more first objects 112. The system may further generate one or more second images corresponding to the graphic information. Details of the generation of the graphic information are further provided, for example, in FIG. 4A.

The system 102 may further be configured to calculate the one or more second depth values associated with the one or more first objects 112, based on the graphic information generated for the one or more first objects 112 from the one or more second viewpoints. In accordance with an embodiment, the one or more second depth values may indicate the depth information (i.e. distance) between the depth sensor 106 and a second plurality of points on the surface of the one or more first objects 112 captured from the one or more second viewpoints. Details of the calculation of the one or more second depth values are further provided, for example, in FIG. 4B. The system 102 may further generate, for the neural network model, the training dataset 116 which may include a first combination of the first image and the first depth value, and a second combination of the one or more second images corresponding to the graphic information and the one or more second depth values. Details of the generation of the training dataset 116 are further provided, for example, in FIG. 4B.

FIG. 2 is a block diagram of a system for generation of a training dataset for depth measurement, in accordance with an embodiment of the disclosure. FIG. 2 is explained in conjunction with elements from FIG. 1. With reference to FIG. 2, there is shown a block diagram 200 of the system 102. The system 102 may include a processor 202 and a memory 204. The memory 204 may further include the training dataset 116 and a neural network model 204A. The system 102 may further include the 3D graphics engine 104, the first I/O device 114 and a network interface 206.

The processor 202 may include suitable logic, circuitry, and interfaces that may be configured to execute a set of instructions stored in the memory 204. The processor 202 may be configured to execute program instructions associated with different operations to be executed by the system 102. For example, some of the operations may include control of the depth sensor 106 to capture the first image of the one or more first objects 112 from the first viewpoint, reception of the tracking information from the handheld device 108, generation of the graphic information corresponding to the one or more first objects 112 from one or more second viewpoints, and calculation of the one or more second depth values associated with the one or more first objects 112. The processor 202 may be further configured to generate the training dataset 116 for training of the neural network model 204A. The processor 202 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 204 may include suitable logic, circuitry, and interfaces that may be configured to store the one or more instructions to be executed by the processor 202. The memory 204 that may be configured to store the training dataset 116 and the neural network model 204A. The memory 204 may be further configured to store, but is not limited to, the first image, the first depth value, the third image related to the first depth value, the tracking information, the graphic information corresponding to the one or more first objects 112, the one or more second depth values, and the one or more fourth images related to the one or more second depth values. Examples of implementation of the memory 204 may include, but are not limited to, Random Access Memory (RAM), Read Only Memory (ROM), Electrically Erasable Programmable Read-Only Memory (EE-PROM), Hard Disk Drive (HDD), a Solid-State Drive (SSD), a CPU cache, and/or a Secure Digital (SD) card.

The neural network model 204A may be a computational network or a system of artificial neurons, arranged in a plurality of layers, as nodes. The plurality of layers of the neural network model 204A may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network model 204A. Outputs of each hidden layer may be coupled to inputs of at least one node in other layers of the neural network model 204A. Node(s) in the final layer may receive inputs from at least one hidden layer to output a result. The number of layers and the number of nodes in each layer may be determined from hyper-parameters of the neural network model 204A. Such hyper-parameters may be set before or while training the neural network model 204A on a training dataset.

Each node of the neural network model 204A may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model 204A. All or some of the nodes of the neural network model 204A may correspond to same or a different same mathematical function.

In training of the neural network model 204A, one or more parameters of each node of the neural network model 204A may be updated based on whether an output of the final layer for a given input (from the training dataset 116) matches a correct result based on a loss function for the neural network model 204A. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

The neural network model 204A may include electronic data, such as, for example, a software program, code of the software program, libraries, applications, scripts, or other logic or instructions for execution by a processing device, such as the processor 202. The neural network model 204A may include code and routines configured to enable a computing device, such as the processor 202 to perform one or more operations for the prediction of the depth information based on provided input (such as new images or computer generated imagery (CGI) input). Additionally, or alternatively, the neural network model 204A may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 204A may be implemented using a combination of hardware and software.

Examples of the neural network model 204A may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the neural network model 204A may include numerical computation techniques using data flow graphs. In certain embodiments, the neural network model 204A may be based on a hybrid architecture of multiple Deep Neural Networks (DNNs). In some embodiments, the neural network model 204A may be an artificial intelligent (AI) engine.

The network interface 206 may include suitable logic, circuitry, and interfaces that may be configured to facilitate communication between the system 102, the depth sensor 106 and the handheld device 108, via the communication network 118. The network interface 206 may be implemented by use of various known technologies to support wired or wireless communication of the system 102 with the communication network 118. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 206 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Figure 3:
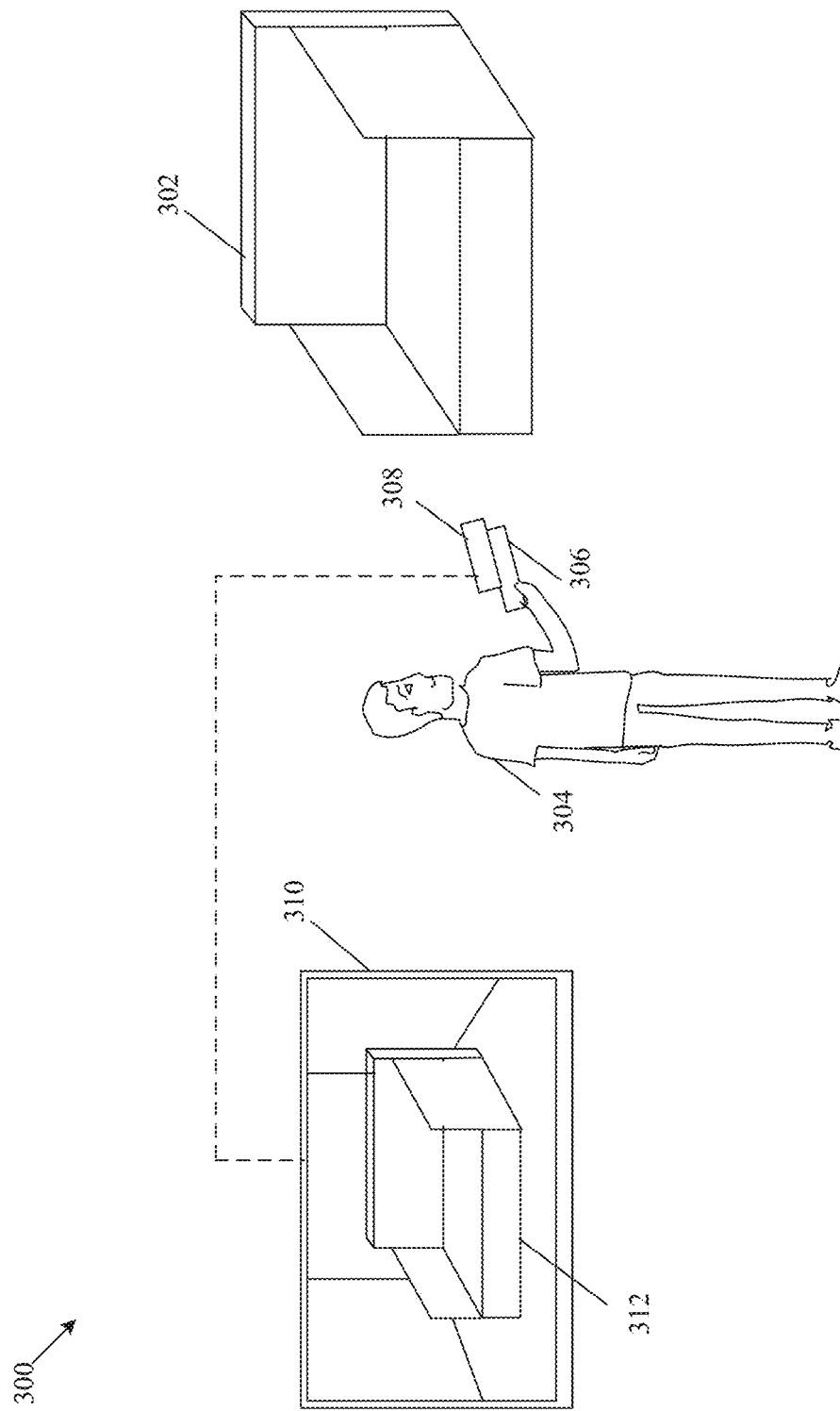
FIG. 3 is an exemplary scenario that depicts capture of a first image for generation of a training dataset for depth measurement, in accordance with an embodiment of the disclosure.

FIG. 3 is an exemplary scenario that depicts capture of a first image for generation of a training dataset for depth measurement, in accordance with an embodiment of the disclosure. FIG. 3 is explained in conjunction with elements from FIGS. 1 and 2. With reference to FIG. 3, there is shown an exemplary scenario 300. The exemplary scenario 300 may include a first object 302 (such as a chair), a user 304, a handheld device 306, a depth sensor 308, a display device 310 associated with the 3D graphics engine 104 (or part of the first I/O device 114). The display device 310 may display the first image 312 captured by the depth sensor 308. The display device 310 and the 3D graphics engine 104 of the disclosed system 102 may be communicatively coupled to the depth sensor 308 and the handheld device 306, via the communication network 118.

The first object 302 of the one or more first objects 112 may be captured by the user 304 via the depth sensor 308, as shown as in FIG. 3. For example, the first image 312 of the first object 302 may be captured from the first viewpoint (such as the front view) by the depth sensor 308. As shown in FIG. 3, the depth sensor 308 and the handheld device 306 (which may be a virtual reality device) may be integrated together. In some embodiments, the processor 202 of the system 102 may be configured to control the depth sensor 308 to capture the first image of the first object 302 and capture one or more first depth values which may indicate distances (for example in certain centimeters, inches, feet, yards, or meters) between the depth sensor 308 and a first plurality of points on a surface (i.e. visible from the first viewpoint) of the first object 302. The processor 202 may transmit an instruction or command to control the depth sensor 308 to capture the first image and one or more first depth values. In some embodiments, the depth sensor 308 or the handheld device 306 may directly receive a user input from the user 304 to control the depth sensor 308 to capture the first image and one or more first depth values related to the first object 302. In an embodiment, the processor 202 may be configured to receive the first image 312 of the first object 302 and the corresponding first depth value associated with the first image 312 from the depth sensor 308.

In an embodiment, the depth sensor 308 along with the handheld device 306 may be moved in the 3D space (i.e. real space) by the user 304. The position information (XYZ information) and the orientation information of the depth sensor 308 may be captured by the handheld device 306, for example, based on the movement of the depth sensor 308 and the handheld device 306 in the 3D space. The handheld device 306 may be further configured to generate tracking information that may include the position information and the orientation information of the handheld device 306 in the 3D space. The processor 202 may be further configured to receive the tracking information from the handheld device 306 for the generation of the graphic information corresponding the first object 302. Details of the generation of the graphic information are further provided, for example, in FIG. 4A-4B.

The graphic information may include or correspond to the first object 302 from the one or more second viewpoints, which may be different from the first viewpoint from which the first image 312 of the first object 302 is captured. For example, the one or more second viewpoints may include or correspond to the first object 302 from the side view, the back view, or the top view. Details of the one or more second viewpoints and the graphic information are further provided, for example, in FIG. 4A. In some embodiments, the processor 202 may receive one or more user inputs from the user 304 (i.e. via the first I/O device 114) to modify the first image 312 (i.e. corresponding to the first object 302) displayed on the display device 310. The processor 202 may further generate the graphic information based on the received one or more user inputs. For example, the user input may be provided by the user 304, via the first I/O device 114, to rotate the first image 312 to obtain the side view of the first object 302 in the 3D graphics engine 104. In another example, the user input may be provided by the user 304 to zoom-in the first image 312 to obtain an enlarged view of the first object 302 in the 3D graphics engine 104. In some embodiments, the 3D graphics engine 104 may control the display device 310 and the first I/O device 114 to rotate or zoom-in the first image 312 to further generate the graphic information from different viewpoints.

The processor 202 may be further configured to calculate the one or more second depth values associated with the first object 302, based on the generated graphic information. For example, the processor 202 may be configured to calculate depth values associated with the side view of the first object 302 and the enlarged view of the first object 302 generated by the 3D graphics engine 104. Thus, the synthetic data (such as the one or more second images corresponding to the graphic information and the one or more second depth values) may be generated that may include the depth information of the first object 302 from different viewpoints, with receipt of one image (such as the first image 312) associated with the first object 302 from the depth sensor 308. The first image 312 of the first object 302 captured by the depth sensor 308 from the first viewpoint may be referred as real data, and the synthetic data virtually generated about the first object 302 from different viewpoints (i.e. generated by the system 102 or the 3D graphics engine 104) may be referred as a virtual data about the first object 302 from various viewpoints. The virtual data may closely mimic the real data with certain variations (i.e. such as modification of viewpoints to generate graphic information). The processor 202 may be further configured to generate the training dataset 116 that may include such real data and the virtual data for different objects as described, for example, in FIG. 4A-4B. It may be noted that the capture of the first image 312 of the first object 302 (as chair), the depth sensor 308, and the handheld device 306 are merely shown in FIG. 3 as an example. The scenario 300 may include different types of objects, depth sensors, and the handheld device, without deviating from the scope of the disclosure.

Figure 4A:
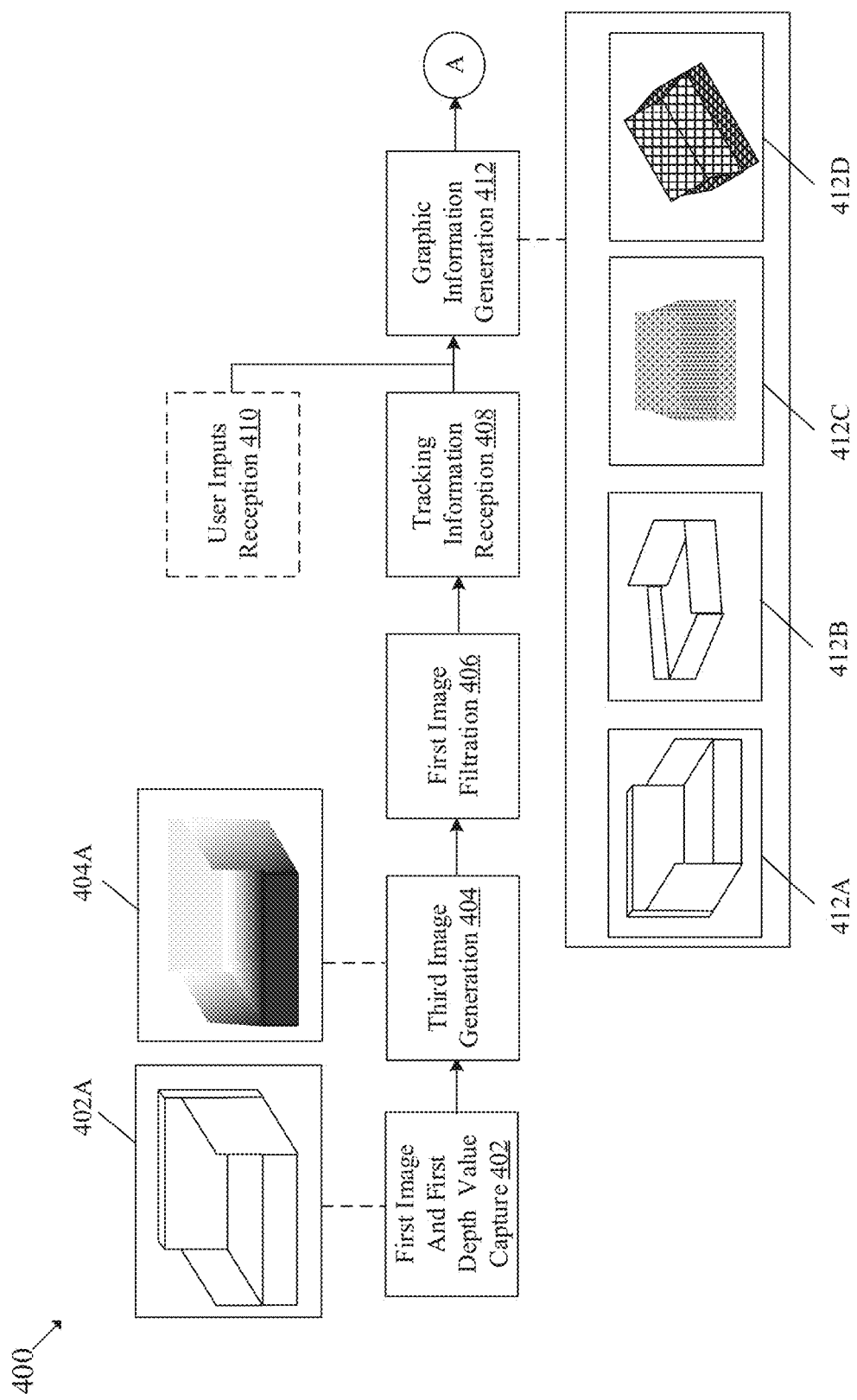
FIGS. 4A-4B collectively illustrate a sequence diagram for exemplary operations for generation of a training dataset for depth measurement, in accordance with an embodiment of the disclosure.
Figure 4B:
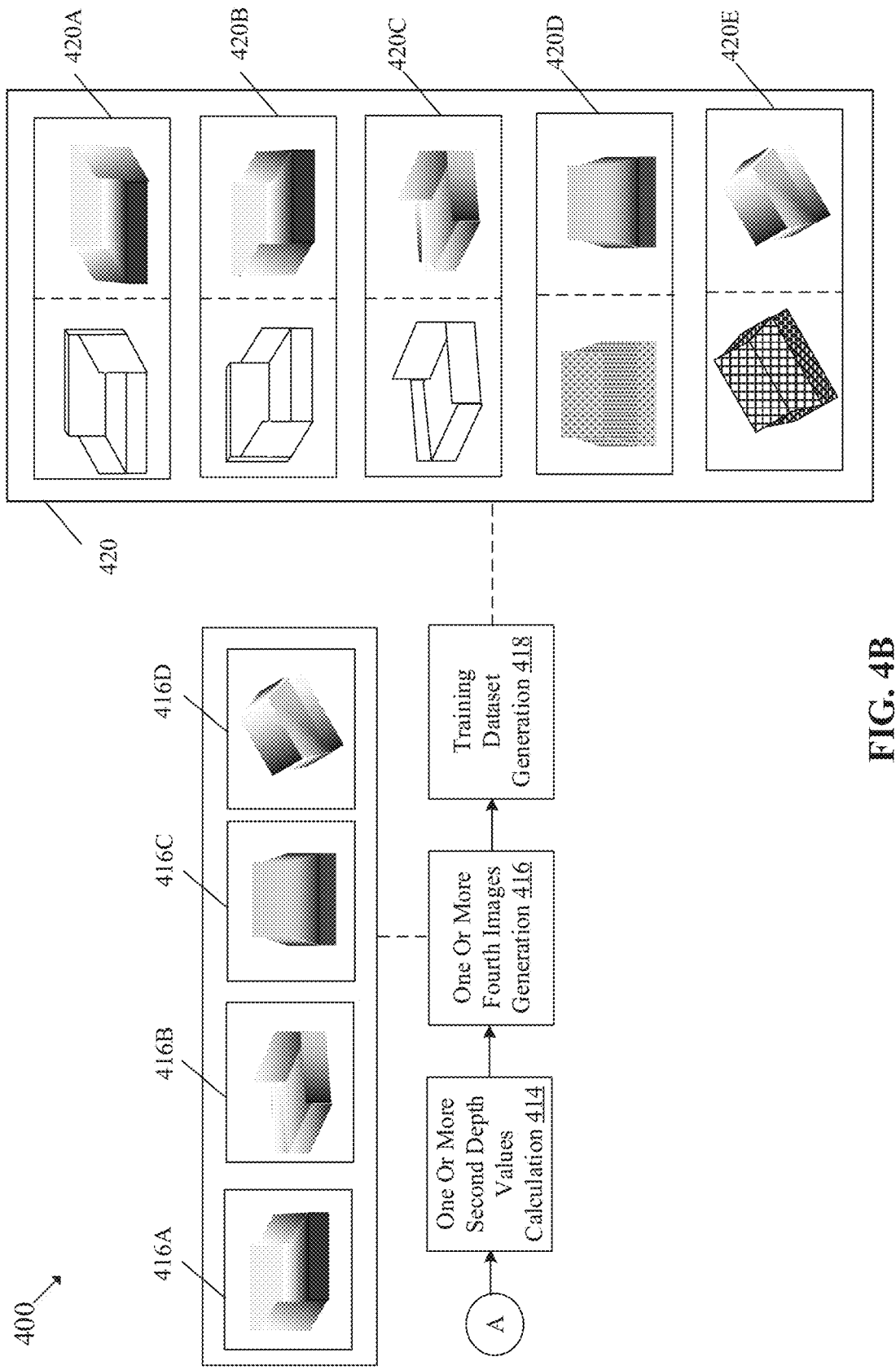

FIGS. 4A-4B collectively illustrate a sequence diagram for exemplary operations for generation of a training dataset for depth measurement, in accordance with an embodiment of the disclosure. FIGS. 4A-4B are explained in conjunction with elements from FIGS. 1, 2, and 3. With reference to FIGS. 4A-4B, there is shown a sequence diagram 400 that illustrates a sequence of operations from 402 to 418. The sequence of operations may be executed by various components of the system 102 of FIG. 1 or the processor 202 in FIG. 2.

At 402, a first image 402A and the first depth value may be captured. In accordance with an embodiment, the processor 202 may be configured to control the depth sensor 308, to capture the first image 402A of the first object 302 of the one or more first objects 112 from the first viewpoint. The processor 202 may further control the depth sensor 308 to capture the first depth value associated with the first object 302. In accordance with an embodiment, the depth sensor 308 may be, but is not limited to, a time of flight (ToF) sensor, a light detection and ranging (LiDAR) sensor, a stereo image sensor, or a structured light sensor. The ToF sensor may utilize infrared light source for capture of the first depth value associated with the first object 302. The LiDAR sensor may utilize a laser light source for capture of the first depth value associated with the first object 302. Moreover, the stereo image sensor may utilize two imaging devices (not shown) to capture the first depth value. The structured light sensor may utilize light patterns projected on the first object 302 to capture the first depth value.

The first image 402A may include the color information of the first object 302. For example, the first image 402A may include the color information such as an actual color (such as red-green-blue (RGB) information) of the first object 302. In accordance with an embodiment, the first depth value may indicate depth information or distance between the depth sensor 308 and a first plurality of points on a surface of the first object 302 of the one or more first objects 112. For example, the first plurality of points on the surface of the first object 302 may include points on the surface of the first object 302 that may lie within a field-of-view of the depth sensor 308 from the first viewpoint. In an example, the surface that may lie within the field-of-view of the depth sensor 308 may include the surface of the first object 302 visible from the first viewpoint. The first depth value may relate to the distance between each of the first plurality of points on the surface of the first object 302 and the depth sensor 308. For example, the first object 302 may be a chair that may include a vertical back rest portion, arm rest portions and a horizontal sitting portion. The depth sensor 308 may capture the first image 402A and the corresponding first depth value from the first viewpoint, such that the horizontal sitting portion may be closer in distance to the depth sensor 308 as compared to the vertical back rest portion. Thus, the first depth value may depict distance values from each of the first plurality of points on the vertical back rest portion, the arm rest portions and the horizontal sitting portion of the chair to the depth sensor 308.

At 404, a third image 404A may be generated. In accordance with an embodiment, the processor 202 may be configured to generate the third image 404A corresponding to the first depth value associated with the first object 302. The processor 202 may receive the first depth value in a first text format from the depth sensor 308. For example, the first text format may be, but not limited to, a semicolon separated values (".SKV") file format. The processor 202 may further convert the first depth value in the first text format into a second text format. For example, the second text format may be, but not limited to, a comma separated values (".CSV") file format. The processor 202 may further generate the third image 404A corresponding to the first depth value based on the second text format. In some embodiments, the third image 404A may be generated based on the first text format of the first depth value, without the conversion to the second text format. The third image 404A may be in different formats, for example (but not limited to), a portable network graphics (PNG) format, a Joint Photographic Experts Group (jpeg) format, a Graphics Interchange Format (GIF) format, a bitmap image file format, or Tagged Image File Format (TIFF).

In accordance with an embodiment, the generated third image 404A may include a different color (i.e. RGB) for different first depth value related to the first plurality of points on the surface of the first object 302. In an exemplary embodiment, the points on the surface of the first object 302 that may be nearest in distance to the depth sensor 308 may include a darkest shade of blue color for corresponding pixels in the third image 404A, and the points that may be farthest in distance may include a lightest shade of the blue color for corresponding pixels in the third image 404A or may include a different color (such as red color). The color, such as the blue color may change (for example decrease in intensity) in form of a gradient in the generated third image 404A, as the distance between the depth sensor 308 and the first plurality of points on the surface of the first object 302 increase. It may be noted that different shades of the blue color to indicate different depth values in the third image 404A is merely an example. The third image 404A may include different color or shades of various other colors to indicate the first depth value of the first object captured by the depth sensor 308, without deviating from the scope of the disclosure.

In an embodiment, a background (such as the first scene 110 in FIG. 1) associated with the first object 302 captured by the depth sensor 308 may include another color, such as a red color in the third image 404A. Therefore, the third image 404A may depict the first depth information (or the first depth values) of the first object 302 captured by the depth sensor 308. In other words, the third image 404A may further depict the depth information associated with the first scene 110 in which the first object 302 may be present. Thus, the disclosed system 102 may represent the depth information captured by the depth sensor 308 of the objects (i.e. present in the real-word) as images (such as the third image).

At 406, the first image 402A may be filtered. In accordance with an embodiment, the processor 202 may be configured to filter the first image 402A of the first object 302 of the one or more first objects 112 captured by the depth sensor 308. The filtration may be performed to clean the first image 402A, such as to remove any redundant or unnecessary information related to the first object 302 in the first image 402A. For example, the background of the first image 402A may be blurred. In another example, the first object 302 may be zoomed-in to acquire a particular view or portion of the first object 302, therefore other portion of the first image 402A may be filtered-out. The filtered first image 402A may be utilized by the processor 202 or the 3D graphics engine 104 to generate the graphic information as described, for example, at 412.

At 408, the tracking information may be received. In accordance with an embodiment, the processor 202 may be configured to receive the tracking information from the handheld device 306 associated with the depth sensor 308, based on the movement of the handheld device 306 and the depth sensor 308 in the 3D space. The handheld device 306 and the depth sensor 308 may be moved by the user 304 in the 3D space (i.e. around the first object 302 shown in FIG. 3) to capture the first image 402A and the first depth value associated with the first object 302. For example, the depth sensor 308 may be moved closer or farther in the 3D space to capture the first object 302. Moreover, the depth sensor 308 may be moved in an upward direction or a downward direction with respect to the first object 302 to capture a first set of images (not shown). The handheld device 306 connected or integrated with the depth sensor 308 may track the movement of the depth sensor 308 in the 3D space to generate the tracking information.

The tracking information may include the position information (XYZ information) or the orientation information (in degrees of rotation in different XY direction) of the depth sensor 308 in the 3D space. For example, the position information may include an exact location of the depth sensor 308 in the 3D space depicted in cartesian coordinates system (such as XYZ coordinates). The orientation information may include an angle of rotation of the depth sensor 308 with respect to a reference axis in the 3D space. For example, the depth sensor 308 may be at an angle of zero degrees with respect to the reference axis in the 3D space while capturing the first image 402A. In another example, the depth sensor 308 may be at an angle of thirty degrees with respect to the reference axis in the 3D space while capturing the first image 402A.

At 410, one or more user inputs may be received. In accordance with an embodiment, the processor 202 may be further configured to receive the one or more user inputs from the user 304 to modify the first image 402A captured from the first viewpoint. In an exemplary scenario, the generated first image 402A may be displayed on the display device 310 associated with the system 102 or the 3D graphics engine 104. The displayed first image 402A may be modified based on the one or more user inputs received from the user 304. For example, the first object 302 in the first image 402A may be rotated at a certain angle by the user 304, via the first I/O device 114, to obtain an image of the first object 302 from a different viewpoint other than the first viewpoint. The one or more user inputs may be received by the user 304 via the first I/O device 114 of the system 102. In another example, the displayed first image 402A of the first object 302 may be moved from one position to another position on the display device 310, to obtain another image of the first object 302 from the different viewpoint than the first viewpoint at which the first image 402A may be originally captured by the depth sensor 308.

At 412, the graphic information may be generated. In accordance with an embodiment, the processor 202 may be configured to generate the graphic information corresponding to the first image 402A of the first object 302 (of the one or more first objects 112) based on the received tracking information. In some embodiments, the graphic information may be generated from the first image 402A (i.e. filtered at 406) based on the received one or more user inputs from the user 304, via the first I/O device 114. The graphic information may include or correspond to the first object 302 from the one or more second viewpoints that may be different from the first viewpoint.

In accordance with an embodiment, the system 102 may further include the 3D graphics engine 104 that may be configured to generate the graphic information corresponding to the first object 302 of the one or more first objects 112 from the one or more second viewpoints, based on the received tracking information and/or based on the one or more user inputs received from the first I/O device 114. The generated graphic information may be displayed on the display device 310 associated with the system 102. Therefore, the 3D graphics engine 104 may allow generation of the graphic information of the first object 302 from different viewpoints, which have not been captured directly by the depth sensor 308 in the real environment (as shown in FIG. 3).

In accordance with an embodiment, the graphic information may include, but is not limited to, the one or more second images, point cloud data, a set of voxels, a three-dimensional (3D) mesh, video information, LAS (LASer) format data or proprietary format data. The one or more second images may correspond to images that may include the color information of the first object 302 from the one or more second viewpoints. For example, the graphic information may include first graphical information 412A, second graphical information 412B, third graphical information 412C, and fourth graphical information 412D. The first graphical information 412A may correspond to an image of the one or more second images of the first object 302 from a second viewpoint which may be different from the first viewpoint. For example, the first graphical information 412A may indicate a horizontally flipped version of the first image 402A of the first object 302. The second graphical information 412B may correspond to an image of the one or more second images from a third viewpoint (i.e. of the one or more second viewpoints) which may be different from the first viewpoint and the second viewpoint. For example, as shown in FIG. 4A, the second graphical information 412B may indicate a rotated and re-sized version of the first image 402A of the first object 302. Thus, multiple images (such as the one or more second images) corresponding to the first object 302 may be generated by the 3D graphics engine 104 of the system 102 based on the received tracking information and/or based on the one or more user inputs received from the user 304 via the first I/O device 114. For example, the 3D graphics engine 104 may receive user inputs on the display device 310 to change the viewpoint (such as rotate, re-size, translate, or move) of the first image 402A (i.e. captured by the depth sensor 308 from one viewpoint) to generate one or more second images. In another example, based on the movement of the handheld device 306 in the 3D space around the first object 302, the 3D graphics engine 104 may change the viewpoints and generate the one or more second images (i.e. such as the first graphical information 412A indicating a side view) of the first object 302, based on the tracking information (i.e. position and/or orientation information) of the handheld device 306.

In an embodiment, the third graphical information 412C may correspond to the point cloud data associated with the first object 302. Each point of the point cloud data may represent a point of the surface of the first object 302. The fourth graphical information 412D may correspond to the 3D mesh associated with the first object 302. The 3D mesh of the first object 302 may represent a 3D model of the first object 302 generated by the 3D graphics engine 104 of the system 102. Therefore, as shown in FIG. 4A as example, the generated graphic information may include representation of the first object 302 from the one or more second viewpoints which is different from the first viewpoint at which the first image 402A is originally captured by the depth sensor 308 in the real environment. The generated graphic information may represent the synthetic data (or virtual data) related to the first object 302 generated by the system 102. In some embodiments, the processor 202 may further control the 3D graphics engine 104 to depict the first scene 110 (such as the real-world surroundings) of the first object 302. The real-world surroundings of the first object 302 may be captured by the depth sensor 308 and the handheld device 306 (for example, the virtual reality device). The 3D graphics engine 104 may further generate the graphic information based on the placement of the first image 402A of the first object 302 in different scenes (such as virtual surroundings).

At 414, the one or more second depth values may be calculated. In accordance with an embodiment, the processor 202 may be configured to calculate the one or more second depth values associated with the first object 302 of the one or more first objects 112, based on the graphic information generated (at 412) from the one or more second viewpoints. In some embodiments, each of the one or more second depth values may indicate the depth information between the depth sensor 308 and a second plurality of points on the surface of the first object 302 captured from the one or more second viewpoints in the generated one or more second images (or the graphic information). The one or more second depth values may relate to a distance between each of the second plurality of points on the surface of the first object 302 in the graphic information and the depth sensor 308.

In accordance with an embodiment, the processor 202 may be configured to receive at least one of first position information or first orientation information of the depth sensor 308 in the tracking information from the handheld device 306 at a first time instance. The first position information or the first orientation information of the depth sensor 308 may correspond to an initial or reference position and/or orientation (for example, in terms of the cartesian coordinate system) of the depth sensor 308 in the 3D space at the first time instance. For example, the first time instance may be related to a time instance of capture of the first image 402A and the first depth values of the first object 302 from the depth sensor 308 (i.e. as described at 402 and in FIG. 3). Thus, the first position information and/or the first orientation information may indicate the reference position and/or orientation of the handheld device 306 or the depth sensor 308 at the time of capture of the first image 402A of the first object 302.

The processor 202 may be further configured to receive at least one of second position information or second orientation information in the tracking information from the handheld device 306 at a second time instance. The second time instance may be the time instance of the movement of the handheld device 306 and the depth sensor 308 in the 3D space or may be the time instance to receive the user inputs, via the first I/O device 114, to modify (i.e. rotate, re-seize, translate, or move) the first object 302 displayed on the display device 310. Therefore, at the second time instance, the processor 202 may identify the change in the position/orientation of the handheld device 306 and/or identify the change in the user inputs to modify the displayed object.

In accordance with an embodiment, the processor 202 or the 3D graphics engine 104 may be further configured to calculate the one or more second depth values associated with the first object 302 of the one or more first objects 112, based on the first position information or the first orientation information (i.e. reference position/orientation) at the first time instance, and based on the second position information or the second orientation information at the second time instance. Thus, the one or more second depth values may be calculated based on the position and/or orientation changes of the depth sensor 308 in the 3D space from the reference position/orientation of the depth sensor 308 (i.e. tracked at the first time instance at which the first depth values of the first object 302 are captured (at 402)). Therefore, changes in the tracking information may be synchronized to generate the graphic information and the second depth values from the one or more second viewpoints different from the first viewpoint. The generation of the graphic information (i.e. the second images) and the second depth values from different viewpoint (for example side view or back view) by the 3D graphics engine 104 may be referred as capture of the first object 302 from a virtual sensor different from the depth sensor 308. The detection of the changes in the position information and/or the orientation information of the depth sensor 308 in the 3D space by the handheld device 306, may accurately provide the distance (i.e. second depth value) between the virtual sensor and each point of the second plurality of points on the surface of the first object 302 from the one or more second viewpoints.

In another embodiment, the processor 202 may receive the one or more user inputs for the first image 402A displayed on the display device 310, to generate the graphic information (i.e. as described at 412). The processor 202 may further calculate the one or more second depth values based on the first depth values calculated during the capture of the first image 402A and further based on the modification performed on the first image 402A as the one or more user inputs. For example, the user inputs provided to rotate the displayed first image 402A of the first object 302 on the display device 310 may be utilized by the processor or the 3D graphics engine 104 to calculate the second depth values based on the original first depth value and the rotation inputs (i.e. in degrees).

In accordance with an embodiment, the processor 202 may be further configured to extract background information from the first image 402A captured by the depth sensor 308. The background information may include information related to the surroundings of the first object 302 (such as the first scene 110). The background information of the first scene 110 may include, but is not limited to, background objects, or background scene (including several objects). The processor 202 may provide the background information to the 3D graphics engine 104 of the system 102 along with the first image 402A to calculate the second depth values.

The processor 202 or the 3D graphics engine 104 may calculate the one or more second depth values associated with the first object 302 based on the background information. In certain situations where the depth sensor 308 moves (i.e. tracked by the tracking information) or the first object 302 moves (i.e. based on the user inputs), the background information may remain same. In such case where the background for the first object 302 is static, the processor 202 may calculate the second depth values based on the first depth value and change in the tracking information and/or the user inputs. However, in case of any change in the background information, the processor 202 may determine distance between the first object 302 and the background objects or scene. In some embodiments, the processor 202 or the 3D graphics engine 104 may further receive the one or more user inputs from the user 304 to alter a location of the first object 302 in the background displayed on the display device 310 which may cause the change in the background or distance between the first object 302 and the background objects or scene. The processor 202 may further calculate the one or more second depth values associated with the first object 302 based on the received tracking information, the user inputs for the modification of the displayed first object 302, and/or the background information.

At 416, the one or more fourth images may be generated. In accordance with an embodiment, the processor 202 may be configured to generate the one or more fourth images corresponding to the calculated one or more second depth values associated with the first object 302 of the one or more first objects 112. The generation of the one or more fourth images from the one or more second depth values may be similar to the generation of the third image 404A from the first depth value as described, for example, at 404 in FIG. 4A. In some embodiments, the generated one or more fourth images may include a different color (i.e. RGB) for a different depth value of the one or more second depth values related to the second plurality of points on the surface of the first object 302. Similar to the third image 404A, the one or more fourth images may be in different formats, for example (but not limited to), a portable network graphics (PNG) format, a Joint Photographic Experts Group (jpeg) format, a Graphics Interchange Format (GIF) format, a bitmap image file format, or Tagged Image File Format (TIFF).

As shown in FIG. 4B, the one or more fourth images may be a set of images 416A-416D (such as an image 416A, an image 416B, an image 416C, and an image 416D). Each of the set of images 416A-416D may include the different color for a different depth value (i.e. second depth values calculated at 414). For example, the color, such as shades of the blue color may change (for example, decrease) in form of a gradient in the generated one or more fourth images, as the distance between the virtual sensor related to the 3D graphics engine 104 and the second plurality of points on the surface of the first object 302 increases. As shown in FIGS. 4A-4B, the image 416A may depict the depth value corresponding to the first graphical information 412A and the image 416B may depict the depth value corresponding to the second graphical information 412B. Similarly, the image 416C may depict the depth value corresponding to the third graphical information 412C and the image 416D may depict the depth value corresponding to the fourth graphical information 412D. In an embodiment, the set of images 416A-416D may correspond to virtual images or virtual data generated from various viewpoints by the disclosed system 102 (including the 3D graphics engine 104) for the first image 402A (i.e. real data) captured from the depth sensor 308 from one viewpoint in the real environment.

At 418, a training dataset 420 may be generated. In accordance with an embodiment, the processor 202 may be configured to generate the training dataset 116 for training the neural network model 204A. The training dataset 420 may include the first combination of the first image 402A (i.e. captured by the depth sensor 308 at 402) and the third image 404A (i.e. generated from the first depth value at 404). The training dataset 420 may further include the second combination of the one or more second images corresponding to the graphic information (i.e. generated by the 3D graphics engine 104 at 412) and the one or more fourth images (i.e. generated at 416) corresponding to the one or more second depth values. In FIG. 4B, there is shown the training dataset 420 generated by the disclosed system 102.

The training dataset 420 may include a first set of images 420A that may be the first combination of the first image 402A and the third image 404A. The first set of images 420A may be the paired set of images on which the neural network model 204A may be trained. For example, the neural network model 204A may be trained on a relationship or mapping between the first image 402A (i.e. captured by the depth sensor 308 in the real environment) and the third image 404A generated for the first depth value (i.e. captured by the depth sensor 308 while capture of the first image 402A). In an embodiment, the neural network model 204A may be trained on a relationship or mapping between the first image 402A (i.e. captured by the depth sensor 308 in the real environment) and the first depth value (i.e. captured by the depth sensor 308 while capture of the first image 402A). The neural network model 204A may be trained to predict the first depth value when the first image 402A or a new image with feature similar to that of the first image 402A may be provided as input to the trained neural network model 204A.

The training dataset 420 may further include a second set of images 420B, a third set of images 420C, a fourth set of images 420D and a fifth set of images 420E (as shown in FIG. 4B) as the second combinations. The second set of images 420B may include the first graphical information 412A and the image 416A that may depict the depth value corresponding to the first graphical information 412A. The third set of images 420C may include the second graphical information 412B and the image 416B that may depict the depth value corresponding to the second graphical information 412B. The fourth set of images 420D may include the third graphical information 412C and the image 416C that may depict the depth value corresponding to the third graphical information 412C. The fifth set of images 420E may include the fourth graphical information 412D and the image 416D that may depict the depth value corresponding to the fourth graphical information 412D. In an embodiment, the second set of images 420B, the third set of images 420C, the fourth set of images 420D, and the fifth set of images 420E may correspond to each of the second combination of the one or more second images corresponding to the graphic information and the one or more fourth images corresponding to the one or more second depth values generated by the 3D graphics engine 104 of the system 102. In some embodiments, the second set of images 420B, the third set of images 420C, the fourth set of images 420D and the fifth set of images 420E may be referred as an unpaired set of images, such that each of the one or more second images (or the graphic information) may be synthetically or virtually generated by the system 102 based on the real data (i.e. first image 402A captured by the depth sensor 308 in the real environment). Such unpaired images (i.e. virtual data) generated by the disclosed system 102, may closely mimic the real data, as the virtual data is generated for the same objects from different viewpoints. Therefore, for each of the first images captured for different objects by the depth sensor 308 from one viewpoint, the disclosed system 102 may generate several second images (or the graphic information), for example, large in number, for the same objects from different viewpoints. The system 102 may further include the first images of different objects and corresponding first depth values (i.e. third image 404A); and include several second images of objects from different viewpoints and corresponding second depth values (i.e. fourth images) as the large training dataset to train the neural network model 204A. The trained neural network model 204A may be utilized to predict the depth values for the images (such as computer-generated imagery (CGI)) which may be input to the trained neural network model 204A (without a need of the depth sensor). Thus, the trained neural network model 204A may be utilized to provide or predict the depth information based on the input images, rather than relying on the depth sensors in real time. The large number of second images (i.e. graphic information) provided by the disclosed system 102 (including the 3D graphics engine 104) may provide large training dataset to increase the accuracy of prediction of the trained neural network model 204A. Further, the generation of the graphic information from various viewpoints (i.e. described at 412) to increase the training dataset may be inexpensive, because the deployment of the depth sensor 308 (or similar expensive depth sensor) at different locations or viewpoints may not be required to capture the large dataset of depth values at the real environment.

In an exemplary scenario, the training dataset 420 may be provided to the neural network model 204A. Each of the first image 402A, the first graphical information 412A, the second graphical information 412B, the third graphical information 412C, and the fourth graphical information 412D of the training dataset 420 may be provided to the neural network model 204A to be considered as an input to the neural network model 204A. Each of the third image 404A, the image 416A, the image 416B, the image 416C, and the image 416D (i.e. all depicting the corresponding depth values of a particular object) of the training dataset 420 may be provided to be considered as the corresponding output (i.e. for each respective input image) for the training of the neural network model 204A. The neural network model 204A may be trained to establish a relationship or mapping between each of the input images and the output images (i.e. related to depth values). In some embodiments, the neural network model 204A may be trained on the training dataset which may include a first combination of the first image 312 and the first depth value, and further include a second combination of one or more second images (corresponding to the graphic information) and the one or more second depth values for different objects. The trained neural network model 204A may automatically predict the depth value (i.e. first depth value or one of the second depth values) for an input image provided to the trained neural network model 204A (i.e. input image similar to the first image 312 or one of the second images on which the neural network model 204A is trained).

Although the diagram 400 is illustrated as discrete operations, such as 402, 404, 406, 408, 410, 412, 414, 416, and 418, however, in certain embodiments, such discrete operations may be further divided into additional operations, combined into fewer operations, or eliminated, depending on the particular implementation without detracting from the essence of the disclosed embodiments.

Figure 5:
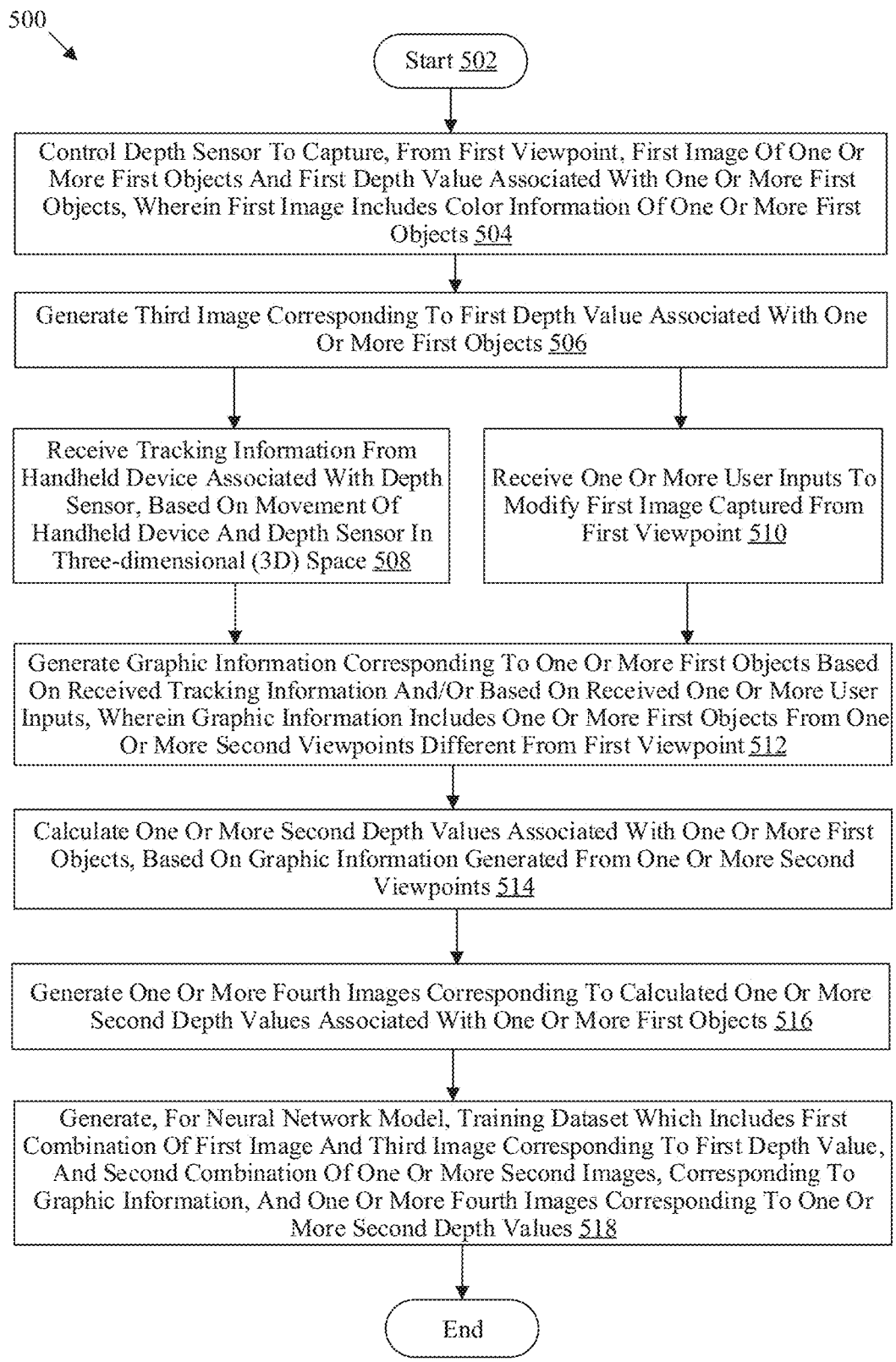
FIG. 5 is a flowchart that illustrates an exemplary method for generation of a training dataset for depth measurement, in accordance with an embodiment of the disclosure.

FIG. 5 is a flowchart that illustrates an exemplary method for generation of a training dataset for depth measurement, in accordance with an embodiment of the disclosure. FIG. 5 is described in conjunction with elements from FIGS. 1, 2, 3, 4A, and 4B. With reference to FIG. 5, there is shown a flowchart 500. The exemplary method of the flowchart 500 may be executed by any computing system, for example, by the system 102 of FIG. 1 or the processor 202 of FIG. 2. The exemplary method of the flowchart 500 may start at 502 and proceed to 504.

At 504, the depth sensor 106 may be controlled to capture, from a first viewpoint, the first image 312 of the one or more first objects 112 and the first depth value associated with the one or more first objects 112. In accordance with an embodiment, the processor 202 may be configured to control the depth sensor 106, to capture, from the first viewpoint, the first image of the one or more first objects 112 and the first depth value associated with the one or more first objects 112. The first image 312 may include the color information (i.e. RGB) of the one or more first objects 112. The control of the depth sensor 106, to capture (from the first viewpoint) the first image 312 of the one or more first objects 112 and the first depth value associated with the one or more first objects 112 is described, for example, at 402 in FIGS. 4A-4B.

At 506, the third image 404A may be generated corresponding to the first depth value associated with the one or more first objects 112. In accordance with an embodiment, the processor 202 may be configured to generate the third image 404A corresponding to the first depth value as described, for example, at 404 in FIGS. 4A-4B.

At 508, the tracking information may be received from the handheld device 108 associated with the depth sensor 106, based on the movement of the handheld device 108 and the depth sensor 106 in the 3D space. In accordance with an embodiment, the processor 202 may be configured to receive the tracking information from the handheld device 108 associated with the depth sensor 106, based on the movement of the handheld device 108 and the depth sensor 106 in the 3D space. The tracking information may indicate at least one of the position information or the orientation information of the depth sensor 106 in the 3D space. The receipt of the tracking information is described, for example, at 408 in FIGS. 4A-4B. Control may pass to 512.

At 510, one or more user inputs may be received to modify the first image captured from the first viewpoint. In accordance with an embodiment, the processor 202 may be configured to receive, via the first I/O device 114, the one or user inputs to modify the first image 402A as described, for example, at 410 in FIGS. 4A-4B.

At 512, the graphic information may be generated corresponding to the one or more first objects 112 based on the received tracking information and/or based on the received one or more user inputs. In accordance with an embodiment, the processor 202 may be configured to generate the graphic information corresponding to the one or more first objects 112 based on the received tracking information and/or based on the received one or more user inputs as described, for example, at 412 in FIGS. 4A-4B.

At 514, one or more second depth values associated with the one or more first objects 112 may be calculated, based on the graphic information generated from the one or more second viewpoints. In accordance with an embodiment, the processor 202 may be configured to calculate the one or more second depth values associated with the one or more first objects 112, based on the graphic information generated from the one or more second viewpoints. The calculation of the one or more second depth values is described, for example, at 414 in FIGS. 4A-4B.

At 516, the one or more fourth images corresponding to the calculated one or more second depth values (i.e. associated with the one or more first objects 112) may be generated. In accordance with an embodiment, the processor 202 may be configured to generate the one or more fourth images corresponding to the calculated one or more second depth values associated with the one or more first objects 112. The generation of the one or more fourth images is described, for example, at 416 in FIGS. 4A-4B.

At 518, the training dataset 116 may be generated. In accordance with an embodiment, the processor 202 may be configured to generate, for the neural network model 204A, the training dataset 116 that may include the first combination of the first image 312 and the third image 404A corresponding to the first depth value, and may include the second combination of the one or more second images (corresponding to the graphic information) and the one or more fourth images corresponding to the one or more second depth values. The generation of the training dataset 116 is described, for example, at 418 in FIGS. 4A-4B. Control may pass to end.

Although the flowchart 500 illustrates discrete operations, such as 504, 506, 508, 510, 512, 514, 516, and 518 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example the system 102). The instructions may cause the machine and/or computer (for example the system 102) to perform operations that include control of a depth sensor (such as the depth sensor 106) to capture, from a first viewpoint, a first image (such as the first image 312) of one or more first objects (such as the one or more first objects 112) and a first depth value associated with the one or more first objects 112. The first image 312 may include color information of the one or more first objects 112. The operations may further include receipt of tracking information from a handheld device (such as the handheld device 108) associated with the depth sensor 106, based on a movement of the handheld device 108 and the depth sensor 106 in a three-dimensional (3D) space. The tracking information may indicate at least one of position information or orientation information of the depth sensor 106 in the 3D space. The operations may further include generation of graphic information corresponding to the one or more first objects 112, based on the received tracking information. The graphic information may include the one or more first objects 112 from one or more second viewpoints different from the first viewpoint. The operations may further include calculation of one or more second depth values associated with the one or more first objects 112, based on the graphic information generated from the one or more second viewpoints. The operations may further include generation, for a neural network model (such as the neural network model 204A), a training dataset (such as the training dataset 116) which may include a first combination of the first image 312 and the first depth value, and a second combination of one or more second images corresponding to the graphic information and the one or more second depth values.

Exemplary aspects of the disclosure may include a system (such as the system 102) that may include a processor (such as the processor 202). The processor 202 may be configured to control a depth sensor (such as the depth sensor 106) to capture, from a first viewpoint, a first image (such as the first image 312) of one or more first objects (such as the one or more first objects 112) and a first depth value associated with the one or more first objects 112. The first image 312 may include color information of the one or more first objects 112. The processor 202 may be further configured to receive tracking information from a handheld device (such as the handheld device 108) associated with the depth sensor 106, based on a movement of the handheld device 108 and the depth sensor 106 in a three-dimensional (3D) space. The tracking information may indicate at least one of position information or orientation information of the depth sensor 106 in the 3D space. The processor 202 may be further configured to generate graphic information corresponding to the one or more first objects 112, based on the received tracking information. The graphic information may include the one or more first objects 112 from one or more second viewpoints different from the first viewpoint. The processor 202 may be further configured to calculate one or more second depth values associated with the one or more first objects 112, based on the graphic information generated from the one or more second viewpoints. The processor 202 may be further configured to generate, for a neural network model (such as the neural network model 204A), a training dataset (such as the training dataset 116) which may include a first combination of the first image 312 and the first depth value, and include a second combination of one or more second images corresponding to the graphic information and the one or more second depth values.

In accordance with an embodiment, the graphic information may correspond to at least one of: the one or more second images, point cloud data, a set of voxels, a three-dimensional (3D) mesh, video information, LAS (LASer) format data or proprietary format data.

In accordance with an embodiment, the processor 202 may be further configured to receive the first depth value in a first text format from the depth sensor 106. The processor 202 may further convert the first depth value in the first text format into a second text format. The processor 202 may generate the third image 404A corresponding to the first depth value based on the second text format.

In accordance with an embodiment, the processor 202 may be further configured to generate the third image 404A corresponding to the first depth value associated with each of the one or more first objects 112. The processor 202 may further generate the one or more fourth images corresponding to the calculated one or more second depth values associated with the one or more first objects 112. The processor 202 may further generate, for the neural network model 204A, the training dataset 116 which may include the first combination of the first image 312 and the third image 404A corresponding to the first depth value, and include the second combination of the one or more second images corresponding to the graphic information and the one or more fourth images corresponding to the one or more second depth values.

In accordance with an embodiment, each of the generated third image 404A and the one or more fourth images may include a different color for a different depth value of the respective first depth value and the one or more second depth values associated with each of the one or more first objects 112.

In accordance with an embodiment, the first depth value may indicate depth information between the depth sensor 106 and a first plurality of points on a surface of the one or more first objects 112 captured from the first viewpoint. Further, each of the one or more second depth values may indicate the depth information between the depth sensor 106 and a second plurality of points on the surface of the one or more first objects 112 captured from the one or more second viewpoints in the generated one or more second images.

In accordance with an embodiment, depth sensor 106 may be one of: a time of flight (ToF) sensor, a light detection and ranging (LiDAR) sensor, a stereo image sensor, or a structured light sensor.

In accordance with an embodiment, the processor 202 may be further configured to receive at least one of first position information or first orientation information of the depth sensor 106 in the tracking information from the handheld device 108 at a first time instance. The processor 202 may further receive at least one of second position information or second orientation information of the depth sensor 106 in the tracking information from the handheld device 108 at a second time instance. The processor 202 may further calculate the one or more second depth values associated with the one or more first objects 112, based on the at least one of the first position information or the first orientation information included in the received tracking information at the first time instance, and based on the at least one of the second position information or the second orientation information included in the received tracking information at the second time instance.

In accordance with an embodiment, the processor 202 may be further configured to extract background information from the first image 312 captured by the depth sensor 106. The processor 202 may further calculate the one or more second depth values associated with the one or more first objects 112 based on the received tracking information and the extracted background information.

In accordance with an embodiment, the system 102 may further include the 3D graphics engine 104. The 3D graphics engine 104 may be configured to generate the graphic information corresponding to the one or more first objects 112 from the one or more second viewpoints, based on the received tracking information.

In accordance with an embodiment, the processor 202 may be configured to receive one or more user inputs to modify the first image 312 captured from the first viewpoint. The processor 202 may further generate the graphic information corresponding to the one or more first objects 112 from the one or more second viewpoints based on the received one or more user inputs.

In accordance with an embodiment, the processor 202 may be further configured to filter the first image 312 of the one or more first objects 112 captured by the depth sensor 106. The processor 202 may further generate the graphic information corresponding to the one or more first objects 112, based on the filtered first image 312 of the one or more first objects 112 and the received tracking information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
    a processor configured to:
        control a depth sensor to capture, from a first viewpoint, a first image of at least one first object and a first depth value associated with the at least one first object, wherein the first image includes color information of the at least one first object;
        generate a second image corresponding to the first depth value associated with the at least one first object;
        receive tracking information from a handheld device associated with the depth sensor, wherein
            the tracking information is based on a movement of the handheld device and the depth sensor in a three-dimensional (3D) space, and
            the tracking information indicates at least one of position information or orientation information of the depth sensor in the 3D space;
        generate graphic information corresponding to the at least one first object based on the received tracking information, wherein the graphic information includes the at least one first object from at least one or second viewpoint different from the first viewpoint;
        calculate at least one second depth value associated with the at least one first object based on the graphic information, wherein each of the at least one second depth value indicates depth information between the depth sensor and a first plurality of points on a surface of the at least one first object from the at least one second viewpoint in the generated graphic information;
        generate at least one third image corresponding to the calculated at least one second depth value associated with the at least one first object; and
        generate, for a neural network model, a training dataset which includes a first combination of the first image and the second image corresponding to the first depth value and a second combination of at least one fourth image corresponding to the graphic information and the at least one third image corresponding to the at least one second depth value.

2. The system according to claim 1, wherein the generated graphic information corresponds to at least one of the at least one fourth image, point cloud data, a set of voxels, a three-dimensional (3D) mesh, video information, LAS (LASer) format data, or proprietary format data.

3. The system according to claim 1, wherein the processor is further configured to:
receive the first depth value in a first text format from the depth sensor;
convert the first depth value in the first text format into a second text format; and
generate the second image corresponding to the first depth value based on the second text format.

4. The system according to claim 1, wherein
each of the generated second image and the at least one fourth image includes a different color for a different depth value of a respective first depth value and the at least one second depth value associated with each of the at least one first object.

5. The system according to claim 1, wherein the first depth value indicates depth information between the depth sensor and a second plurality of points on the surface of the at least one first object.

6. The system according to claim 1, wherein the depth sensor is one of a time of flight (ToF) sensor, a light detection and ranging (LiDAR) sensor, a stereo image sensor, or a structured light sensor.

7. The system according to claim 1, wherein the processor is further configured to:
receive at least one of first position information or first orientation information of the depth sensor from the handheld device at a first time instance;
receive at least one of second position information or second orientation information of the depth sensor from the handheld device at a second time instance; and
calculate the at least one second depth value associated with the at least one first object based on at least one of the first position information or the first orientation information and at least one of the second position information or the second orientation information.

8. The system according to claim 7, wherein the processor is further configured to:
extract background information from the first image; and
calculate the at least one second depth value based on the received tracking information and the extracted background information.

9. The system according to claim 1, further comprising a three-dimensional (3D) graphics engine configured to generate the graphic information based on the received tracking information.

10. The system according to claim 1, wherein the processor is further configured to:
receive at least one user input to modify the first image; and
generate the graphic information based on the received at least one user input.

11. The system according to claim 1, wherein the processor is further configured to:
filter the first image; and
generate the graphic information based on the filtered first image and the received tracking information.

12. A method, comprising:
in a system:
controlling a depth sensor to capture, from a first viewpoint, a first image of at least one first object and a first depth value associated with the at least one first objects, wherein the first image includes color information of the at least one first object;
generating a second image corresponding to the first depth value associated with the at least one first object;
receiving tracking information from a handheld device associated with the depth sensor, wherein
the tracking information is based on a movement of the handheld device and the depth sensor in a three-dimensional (3D) space, and
the tracking information indicates at least one of position information or orientation information of the depth sensor in the 3D space;
generating graphic information corresponding to the at least one first object based on the received tracking information, wherein the graphic information includes the at least one first object from at least one second viewpoint different from the first viewpoint;
calculating at least one second depth value associated with the at least one first object based on the graphic information, wherein each of the at least one second depth value indicates depth information between the depth sensor and a first plurality of points on a surface of the at least one first objects from the at least one second viewpoint in the generated graphic information;
generating at least one third image corresponding to the calculated at least one second depth value associated with the at least one first object; and
generating, for a neural network model, a training dataset which includes a first combination of the first image and the second image corresponding to the first depth value and a second combination of at least one fourth image corresponding to the graphic information and the at least one third image corresponding to the at least one second depth value.

13. The method according to claim 12, further comprising:
receiving the first depth value in a first text format from the depth sensor;
converting the first depth value in the first text format into a second text format; and
generating the second image corresponding to the first depth value based on the second text format.

14. The method according to claim 12, wherein the first depth value indicates depth information between the depth sensor and a second plurality of points on the surface of the at least one first object.

15. The method according to claim 12, further comprising:
receiving at least one of first position information or first orientation information of the depth sensor from the handheld device at a first time instance;
receiving at least one of second position information or second orientation information of the depth sensor from the handheld device at a second time instance; and
calculating the at least one second depth value associated with the at least one first object based on at least one of the first position information or the first orientation information and at least one of the second position information or the second orientation information.

16. The method according to claim 12, further comprising:
  extracting background information from the first image; and
  calculating the at least one second depth value based on the received tracking information and the extracted background information.

17. The method according to claim 12, comprising:
  receiving at least one user input to modify the first image; and
  generating the graphic information based on the received at least one user input.

18. A non-transitory computer-readable medium having stored thereon computer implemented instructions that, when executed by a processor, cause the processor to execute operations, the operations comprising:
  controlling a depth sensor to capture, from a first viewpoint, a first image of at least one first object and a first depth value associated with the at least one first object, wherein the first image includes color information of the at least one first object;
  generating a second image corresponding to the first depth value associated with the at least one first object;
  receiving tracking information from a handheld device associated with the depth sensor, wherein
    the tracking information is based on a movement of the handheld device and the depth sensor in a three-dimensional (3D) space, and
    the tracking information indicates at least one of position information or orientation information of the depth sensor in the 3D space;
  generating graphic information corresponding to the at least one first object based on the received tracking information, wherein the graphic information includes the at least one first object from at least one second viewpoint different from the first viewpoint;
  calculating at least one second depth value associated with the at least one first object based on the graphic information, wherein each of the at least one second depth value indicates depth information between the depth sensor and a first plurality of points on a surface of the at least one first object from the at least one second viewpoint in the generated graphic information;
  generating at least one third image corresponding to the calculated at least one second depth value associated with the at least one first object; and
  generating, for a neural network model, a training dataset which includes a first combination of the first image and the second image corresponding to the first depth value and a second combination of at least one fourth image corresponding to the graphic information and the at least one third image corresponding to the at least one second depth value.

* * * * *